US009924361B2

United States Patent
Chen et al.

(10) Patent No.: US 9,924,361 B2
(45) Date of Patent: Mar. 20, 2018

(54) INFORMATION PROCESSING METHOD AND ELECTRONIC DEVICE

(71) Applicant: LENOVO (BEIJING) LIMITED, Beijing (CN)

(72) Inventors: Xuan Chen, Beijing (CN); Shenlin Li, Beijing (CN); Xiangjin Sun, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 14/491,170

(22) Filed: Sep. 19, 2014

(65) Prior Publication Data
US 2015/0249924 A1 Sep. 3, 2015

(30) Foreign Application Priority Data

Mar. 3, 2014 (CN) .......................... 2014 1 0074827

(51) Int. Cl.
H04M 1/66 (2006.01)
H04M 1/68 (2006.01)
H04M 3/16 (2006.01)
H04W 12/08 (2009.01)
H04M 1/725 (2006.01)
H04M 1/673 (2006.01)

(52) U.S. Cl.
CPC ....... H04W 12/08 (2013.01); H04M 1/72583 (2013.01); *H04M 1/673* (2013.01); *H04M 2250/12* (2013.01)

(58) Field of Classification Search
None
See application file for complete search history.

(56) References Cited

U.S. PATENT DOCUMENTS

| 6,574,484 | B1* | 6/2003 | Carley ............... G08B 25/016 |
| | | | 455/404.1 |
| 2009/0247123 | A1* | 10/2009 | Lee .................. G07C 9/00039 |
| | | | 455/410 |
| 2010/0306718 | A1 | 12/2010 | Shim et al. |
| 2011/0283241 | A1* | 11/2011 | Miller ................ G06F 3/04883 |
| | | | 715/863 |

(Continued)

FOREIGN PATENT DOCUMENTS

| CN | 101661373 A | 3/2010 |
| CN | 101986251 A | 3/2011 |
| CN | 102455839 A | 5/2012 |

(Continued)

OTHER PUBLICATIONS

Office Action from SIPO for Chinese application No. 201410074827.7, dated Mar. 21, 2017, pp. 8.

(Continued)

*Primary Examiner* — Martin Mushambo
(74) *Attorney, Agent, or Firm* — Sills Cummis & Gross P.C.

(57) ABSTRACT

The present disclosure discloses an information processing method and an electronic device. A first operation on an unlocking graphic interface of the electronic device is acquired in a locked state. It is detected whether digit information corresponding to the first operation matches a phone number. The phone number is called when the digit information matches the phone number.

6 Claims, 2 Drawing Sheets

(56) References Cited

U.S. PATENT DOCUMENTS

2013/0052993 A1* 2/2013 Kwon ................... G06F 21/36
455/411
2013/0318066 A1* 11/2013 Atherton ........... G06F 17/30864
707/709

FOREIGN PATENT DOCUMENTS

| CN | 102556861 A | 7/2012 |
| CN | 102880398 A | 1/2013 |
| CN | 103309479 A | 9/2013 |
| CN | 103440109 A | 12/2013 |
| CN | 103581437 A | 2/2014 |

OTHER PUBLICATIONS

English abstract of CN101661373, published Mar. 10, 2010, pp. 1.
English abstract of CN101986251, published Mar. 16, 2011, pp. 1.
English abstract of CN102455839, published May 16, 2012, pp. 1.
English abstract of CN102566861, published Jul. 11, 2012, pp. 1.
English abstract of CN102880398, published Jan. 16, 2013, pp. 1.
English abstract of CN103309479, published Sep. 18, 2013, pp. 1.
English abstract of CN103440109, published Dec. 11, 2013, pp. 1.
English abstract of CN103581437, published Feb. 12, 2014, pp. 1.

* cited by examiner

INFORMATION PROCESSING METHOD AND ELECTRONIC DEVICE

CROSS-REFERENCE TO RELATED APPLICATION(S)

This application claims priority to Chinese Application No. 201410074827.7, entitled "INFORMATION PROCESSING METHOD AND ELECTRONIC DEVICE", filed on Mar. 3, 2014, which is incorporated herein by reference in their entirety.

BACKGROUND

Technical Field

The present disclosure relates to the field of computer technology, in particular, to an information processing method and an electronic device.

Related Art

With the rapid development of electronic devices, the electronic devices are widely used in daily lives. The existing electronic devices have increasingly rich functions, such as smart phones, PADs and the like, powerful processing capabilities, and network access anytime and anywhere. This enables the electronic devices to become more popular. An existing electronic device usually has different screen locks, such as a password lock, a pattern lock and the like, to improve the security performance and better protect the privacy of its user.

However, when an existing electronic device has not been unlocked, that is, when the electronic device has been locked, the electronic device can only respond to the unlocking app, the volume app, the music app and the like. In this way, only when the electronic device has been unlocked, a dialing operation may be performed, thereby achieving calling another electronic device. Therefore, there is a problem that a call cannot be made when an electronic device has been locked.

SUMMARY

An embodiment of the present disclosure provides an information processing method and an electronic device, which can address the technical problem that a phone call cannot be made when an existing electronic device has been locked.

An embodiment of the present disclosure provides an information processing method. The method includes: acquiring a first operation on an unlocking graphic interface of an electronic device in a locked state; detecting whether digit information corresponding to the first operation matches a phone number; and calling the phone number when the digit information matches the phone number.

Optionally, calling the phone number when the digit information matches the phone number comprises: searching communication information stored in the electronic device; and calling the phone number when the phone number is found in the communication information.

Optionally, when the digit information does not match the phone number, the method further comprises: detecting whether the digit information meets an unlocking condition; and controlling a current state of the electronic device to be changed from the locked state to an unlocked state when the digit information meets the unlocking condition.

Optionally, when the digit information does not match the phone number, the method further comprises: determining, from the unlocking graphic interface, a first unlocking graphic corresponding to the first operation; and controlling a current state of the electronic device to be changed from the locked state to an unlocked state when the first unlocking graphic meets an unlocking condition.

Optionally, controlling the current state of the electronic device to be changed from the locked state to the unlocked state when the digit information meets the unlocking condition comprises: acquiring a second operation on the unlocking graphic interface; determining, from the unlocking graphic interface, a second unlocking graphic corresponding to the second operation; and controlling the current state of the electronic device to be changed from the locked state to the unlocked state when both of the second unlocking graphic and the digit information meet the unlocking condition.

Optionally, the graphics in the unlocking graphic interface correspond to at least digits from 0 to 9.

An embodiment of the present disclosure further provides electronic device, comprising: a first operation acquiring unit configured to acquire a first operation on an unlocking graphic interface of the electronic device in a locked state; a first detecting unit configured to detect whether digit information corresponding to the first operation matches a phone number; and a calling unit configured to call the phone number when the digit information matches the phone number.

Optionally, the electronic device further comprises a searching unit configured to search communication information stored in the electronic device. The calling unit is further configured to call the phone number when the phone number is found in the communication information.

Optionally, the electronic device further comprises a second detecting unit configured to detect whether the digit information meets an unlocking condition when the digit information does not match the phone number. The electronic device further comprises a first unlocking unit configured to control a current state of the electronic device to be changed from the locked state to an unlocked state when the second detecting unit detects that the digit information meets the unlocking condition.

Optionally, the electronic device further comprises a first graphic determining unit configured to determine, from the unlocking graphic interface, a first unlocking graphic corresponding to the first operation when the digit information does not match the phone number. The electronic device further comprises a second unlocking unit configured to control a current state of the electronic device to be changed from the locked state to an unlocked state when the first unlocking graphic meets an unlocking condition.

Optionally, the electronic device further comprises a second operation acquiring unit configured to acquire a second operation on the unlocking graphic interface. The electronic device further comprises a second graphic determining unit configured to determine, from the unlocking graphic interface, a second unlocking graphic corresponding to the second operation. The electronic device further comprises a third unlocking unit configured to control the current state of the electronic device to be changed from the locked state to the unlocked state when both of the second unlocking graphic and the digit information meet an unlocking condition.

One or more technical solutions provided by the embodiments of the present disclosure have at least technical effects or advantages as follows.

DETAILED DESCRIPTION

An embodiment of the present disclosure provides an information processing method and a first electronic device, which can solve the technical problem that a phone call cannot be made when an existing electronic device is in the locked state.

In order to address the above technical problem, the general concept behind the technical solutions according to the embodiments of the present disclosure is described as follows.

In an embodiment of the present disclosure, the first operation on the unlocking graphic interface is acquired when the first electronic device is in the locked state, and the second electronic device is called when the digit information corresponding to the first operation is the phone number. In this way, it enables the first electronic device to call the second electronic device by the first operation on the unlocking graphic interface even when the first electronic device is in the locked state. This can solve the technical problem that a call cannot be made when an existing electronic device is in the locked state and achieve the technical effect that a call can be made even when the electronic device has been locked, while improving usability and bring the better user experience.

In order to understand the above technical solutions in a better way, detailed explanation of the above technical solutions will be given with reference to the drawings and detailed descriptions.

An embodiment of the present disclosure provides an information processing method. The method is applied in a first electronic device having a touch display unit. The first electronic device has an unlocked state and a locked state. An unlocking graphic interface is displayed on the touch display unit when the first electronic device is in the locked state. Graphics in the unlocking graphic interface correspond to a plurality of digits. The first electronic device may be an electronic device, such as a tablet computer, a smart phone, a notebook computer and the like.

For example, the touch display unit may be an LED touch screen, an LCD touch screen and the like electronic device.

Figure 1:
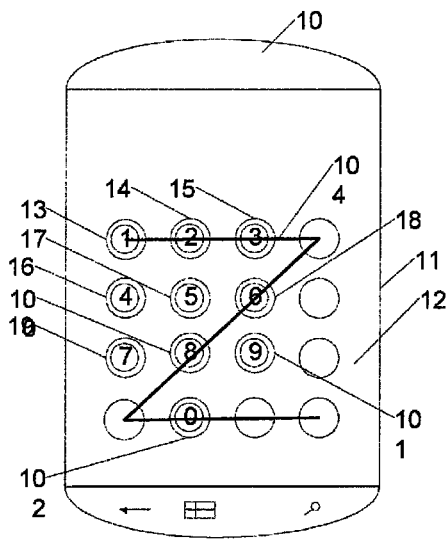
FIG. 1 is an illustration of graphics shown on a display unit of an electronic device according to an embodiment of the present disclosure.

In particular, referring to FIG. 1, when a smart phone 10 is in the locked state, an unlocking graphic interface 12 is displayed on a touch screen 11 of the smart phone 10. The unlocking graphic interface 12 includes twelve graphics, all of which are circles. Ten of the twelve graphics correspond to the digits from 0 to 9.

Figure 2:
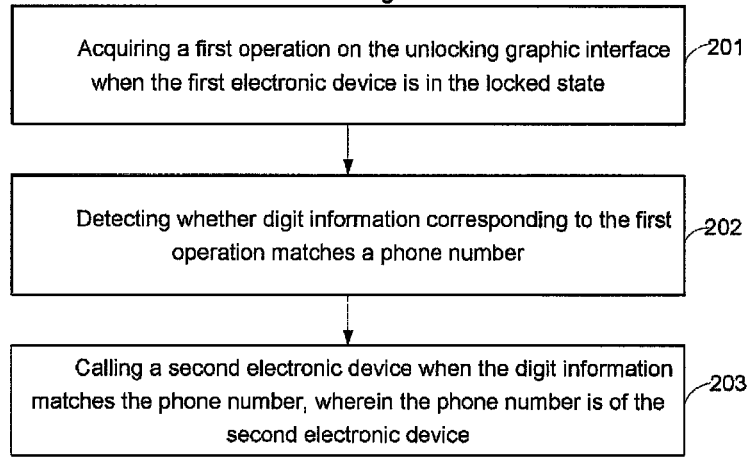
FIG. 2 is a flow chart of an information processing method according to an embodiment of the present disclosure.

Referring to FIG. 2, the method includes the following steps.

At step 201, a first operation on the unlocking graphic interface is acquired when the first electronic device is in the locked state.

At step 202, it is detected whether digit information corresponding to the first operation is a phone number.

At step 203, a second electronic device is called when the digit information is the phone number, wherein the phone number is of the second electronic device.

The method starts with step 101, in which a first operation on the unlocking graphic interface is acquired when the first electronic device is in the locked state.

In a specific implementation, when the first electronic device is in the locked state, a sensor on the touch display unit is used to detect whether there is an operation on the unlocking graphic interface in real time. When it is detected that there is an operation on the unlocking graphic interface, the detected operation on the unlocking graphic interface is the first operation. For example, the sensor is a capacitive sensor, a resistive sensor, and the like electronic device.

To be specific, the first operation may be an operation of clicking continuously or an operation of sliding continuously, and the present disclosure is not limited thereto.

For example, referring to FIG. 1, when the smart phone 10 is in the locked state, a capacitive sensor on the touch screen 11 is used to acquire a sliding operation of a user A on the unlocking graphic interface 12. In other words, the sliding operation is the first operation and corresponds to a "Z"-shaped graphic 104.

Next, the method proceeds to step 202 of detecting whether the digit information corresponding to the first operation is a phone number.

In a specific implementation, the digit information corresponding to the first operation is acquired first, and then it is detected whether the digit information is the phone number. When the digit information is the phone number, the method proceeds to step 203.

To be specific, after the first operation is acquired at step 201, at least one graphic corresponding to the first operation is determined from the unlocking graphic interface, and then the digit information corresponding to the at least one graphic is acquired. After that, whether the digit information is the phone number is detected.

In particular, the graphics in the unlocking graphic interface correspond to at least the digits from 0 to 9. In this way, when the at least one graphic corresponding to the first operation is determined from the unlocking graphic interface, the digit information corresponding to the at least one graphic may be acquired, and whether the digit information is the phone number is then detected.

In particular, the detecting of whether the digit information is the phone number may specifically comprise: detecting whether the digit information meets a number rule corresponding to the phone number. When the digit information meets the number rule, it can be determined that the digit information is the phone number. Otherwise, it can be determined that the digit information is not the phone number. The number rule may be a rule specifying that the number should begin with 136, 133, 159, or the like and that the length of the digit information should be 11 digits.

For example, referring to FIG. 1, when the smart phone 10 is in the locked state, the unlocking graphic interface 12 includes twelve graphics, all of which are circles. The graphic 13 corresponds to the digit 1, the graphic 14 corresponds to the digit 2, the graphic 15 corresponds to the digit 3, the graphic 16 corresponds to the digit 4, the graphic 17 corresponds to the digit 5, the graphic 18 corresponds to the digit 6, the graphic 19 corresponds to the digit 7, the graphic 100 corresponds to the digit 8, the graphic 101 corresponds to the digit 9, and the graphic 102 corresponds to the digit 0. In this way, the graphics in the unlocking graphic interface 12 correspond to the digits from 0 to 9.

When the smart phone 10 is in the locked state, a sliding operation of the user A on the unlocking graphic interface 12 is acquired by a capacitive sensor arranged on the touch screen 11. A "Z"-shaped graphic 104 corresponding to the sliding operation is acquired. As the Z-shaped graphic 104 passes the graphics 13, 14, 15, 18, 100, and 102 on the unlocking graphic interface 12 only, and each of these graphics corresponds to a digit, the digit information corresponding to the sliding operation is 123680. It is detected whether 123680 is a phone number. Since 123680 is not the phone number, step 203 is not performed.

Further, when the smart phone 10 is in the locked state, a continuous clicking operation of the user A on the unlocking graphic interface 12 is acquired by a capacitive sensor arranged on the touch screen 11. If the digit information corresponding to the continuous clicking operation is 13628785679, the method proceeds to step 203 because 13628785679 is the phone number.

In a specific implementation, when the digit information is not the phone number, the method further comprises: detecting whether the digit information meets an unlocking condition; and controlling current state of the first electronic device to be changed from the locked state to the unlocked state when the digit information meets the unlocking condition.

To be specific, when the digit information is not the phone number, the unlocking condition set by the first electronic device is determined and then it is detected whether the digit information meets the unlocking condition. When the digit information meets the unlocking condition, the current state of the first electronic device is controlled to be changed from the locked state to the unlocked state.

For example, the unlocking condition may be a set of digits, a gesture and the like information. When the digit information meets the unlocking condition, an unlocking instruction is generated. The unlocking instruction is executed such that the first electronic device is changed from the locked state to the unlocked state. When the digit information does not meet the unlocking condition, there may be no response to the first operation.

For example, when the smart phone 10 is in the locked state, a sliding operation of the user A on the unlocking graphic interface 12 is acquired by a capacitive sensor arranged on the touch screen 11. A "Z"-shaped graphic 104 corresponding to the sliding operation is acquired. Because the digit information corresponding to the sliding operation is 123680, it is detected whether 123680 is a phone number. Because 123680 is not the phone number, it is detected whether the digit information meets the unlocking condition. If the unlocking condition is the digits of 123680, then it can be determined that the digit information meets the unlocking condition, and the smart phone 10 is controlled to be changed from the locked state to the unlocked state. If the unlocking condition is the digits of 12450, the digit information does not meet the unlocking condition, and then there may be no response to the first operation.

In a specific implementation, when the digit information is not the phone number, the method further comprises: determining, from the unlocking graphic interface, a first unlocking graphic corresponding to the first operation; and controlling a current state of the first electronic device to be changed from the locked state to the unlocked state when the first unlocking graphic meets the unlocking condition.

To be specific, when the digit information is not the phone number, the first unlocking graphic may be determined first, and it is then detected whether the first unlocking graphic meets the unlocking condition. When the unlocking condition is met, the current state of the first electronic device is controlled to be changed from the locked state to the unlocked state. Otherwise, there may be no response to the first operation.

In particular, when the digit information is not the phone number, it may be detected concurrently whether the digit information and the first unlocking graphic meet the unlocking condition. When the digit information or the first unlocking graphic meets the unlocking condition, the current state of the first electronic device is controlled to be changed from the locked state to the unlocked state. When neither the digit information nor the first unlocking graphic meets the unlocking condition, there may be no response to the first operation.

For example, when the smart phone 10 is in the locked state, a sliding operation of the user A on the unlocking graphic interface 12 is acquired by the capacitive sensor arranged on the touch screen 11. A Z-shaped graphic 104 corresponding to the sliding operation is acquired. When it is detected that the digit information of 123680 corresponding to the sliding operation is not the phone number, it is detected whether 123680 and the Z-shaped graphic 104 meet the unlocking condition. If 123680 or the Z-shaped graphic 104 meets the unlocking condition, then the smart phone 10 is controlled to be changed from the locked state to the unlocked state. If neither 123680 nor the Z-shaped graphic 104 meets the unlocking condition, then there may be no response to the first operation.

When the digit information is the phone number, then the method proceeds to step 203 of calling a second electronic device, wherein the phone number is of the second electronic device.

To be specific, when it is detected at step 202 that the digit information is the phone number, the second electronic device having the phone number is called.

For example, referring to FIG. 1, when the smart phone 10 is in the locked state, a continuous clicking operation of the user A on the unlocking graphic interface 12 is acquired by the capacitive sensor arranged on the touch screen 11. If the digit information corresponding to the continuous clicking operation is 13628785679, a mobile phone whose number is 13628785679 is called because 13628785679 is the phone number.

In a specific implementation, when the digit information is the phone number, the communication information stored in the first electronic device is searched for a number matched with the digit information. When the number matched with the digit information is found in the communication information, the second electronic device is called.

To be specific, in order to prevent the first electronic device from being misused by someone else and improve the security of the electronic device, when the digit information is the phone number, a number matched with the digit information is required to be searched in the communication information, and the second electronic device is called when the matched number is found. Otherwise, it is prohibited to call to the second electronic device.

In particular, the communication information may be contact information stored in the first electronic device. The contact information includes names and phone numbers of contacts. The phone numbers in the communication information is searched for a number matched with the digit information. When a matched number is found, the second electronic device is called. Otherwise, it is prohibited to call the second electronic device.

For example, referring to FIG. 1, when the smart phone 10 is in the locked state, a continuous clicking operation of the user A on the unlocking graphic interface 12 is acquired by the capacitive sensor arranged on the touch screen 11. If the digit information corresponding to the continuous clicking operation is 13628785679, then it can be determined that 13628785679 is the phone number. Then the smart phone 10 searches for a number matched with 13628785679 in the contact list. When the number matched with 13628785679 is found in the contact list, a mobile phone having a phone number of 13628785679 is called. If no number matched with 13628785679 is found, there is no operation of calling the mobile phone having the phone number of 13628785679.

In another embodiment, the controlling of the current state of the first electronic device to be changed from the locked state to the unlocked state when the digit information meets the unlocking condition specifically comprises: acquiring a second operation on the unlocking graphic interface; determining, from the unlocking graphic interface, a second unlocking graphic corresponding to the second operation; and controlling the current state of the first electronic device to be changed from the locked state to the unlocked state when both of the second unlocking graphic and the digit information meet the unlocking condition.

In a specific implementation, the unlocking condition of the first electronic device may be set to be a combination of a gesture and digits to further improve the security performance of the first electronic device. When the digit information meets the unlocking condition, the second unlocking graphic corresponding to the second operation is acquired. When the second unlocking graphic also meets the unlocking operation, the current state of the first electronic device is controlled to be changed from the locked state to the unlocked state.

To be specific, when it is detected that the first unlocking graphic meets the unlocking condition, a third operation on the unlocking graphic interface is also acquired. Second digit information corresponding to the third operation is determined from the unlocking graphic interface. When the second digit information also meets the unlocking condition, the current state of the first electronic device is controlled to be changed from the locked state to the unlocked state.

For example, referring to FIG. 2, when the smart phone 10 is in the locked state, a sliding operation of the user A on the unlocking graphic interface 12 is acquired by the capacitive sensor arranged on the touch screen 11. A Z-shaped graphic 104 corresponding to the sliding operation is acquired. When it is detected that the digit information corresponding to the sliding operation is 123680, which is not the phone number, it is detected whether the Z-shaped graphic 104 meets the unlocking condition. If the Z-shaped graphic 104 meets the unlocking condition, a continuous clicking operation of the user A on the unlocking graphic interface 12 is acquired, and second digit information of 831106 corresponding to the continuous clicking operation is acquired. If 831106 also meets the unlocking condition, then the smart phone 10 is controlled to be changed from the locked state to the unlocked state. If 831106 does not meet the unlocking condition, then no operation is performed.

One or more technical solutions provided by the embodiments of the present disclosure have at least technical effects or advantages as follows:

Firstly, in an embodiment of the present disclosure, when the first electronic device is in the locked state, the first operation on the unlocking graphic interface is acquired, and the second electronic device is called when the digit information corresponding to the first operation is the phone number. In this way, it enables the first electronic device to call the second electronic device by the first operation on the unlocking graphic interface even when the first electronic device is in the locked state. Thereby, this can solve the technical problem that a call cannot be made when an existing electronic device is in the locked state and achieve the technical effect that a call can be made even when the electronic device is in the locked state, while improving usability and brining the better user experience.

Secondly, in an embodiment of the present disclosure, the second electronic device is called when a number matched with the digit information is found in the communication information stored in the first electronic device. This can improve the security of the electronic device, while bring the better user experience.

Thirdly, in an embodiment of the present disclosure, the current state of the first electronic device is controlled to be changed from the locked state to the unlocked state after the second unlocking graphic corresponding to the second operation on the unlocking graphic interface is acquired and both of the second unlocking graphic and the digit information meet the unlocking condition. This can perform the unlocking by means of gestures and passwords, and therefore improve the security of the electronic device.

Based on the same technical concept as the above method, an embodiment of the present disclosure further provides a first electronic device having a touch display unit. The first electronic device has an unlocked state and a locked state. When the first electronic device is in the locked state, an unlocking graphic interface is displayed on the touch display unit. Graphics in the unlocking graphic interface correspond to a plurality of digits.

The first electronic device may be an electronic device, such as a tablet computer, a smart phone, a notebook computer, or the like. Further, the touch display unit is an electronic device, such as an LED touch screen, an LCD touch screen, or the like.

In particular, referring to FIG. 1, when a smart phone 10 is in the locked state, an unlocking graphic interface 12 is displayed on a touch screen 11 of the smart phone 10. The unlocking graphic interface 12 includes twelve graphics, all of which are circles. Ten of the twelve graphics correspond to the digits from 0 to 9.

Figure 3:
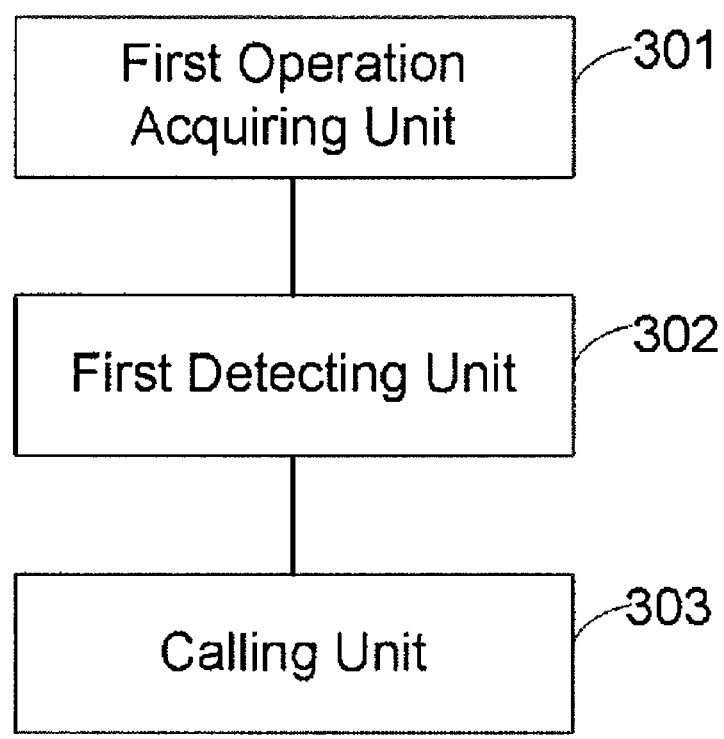
FIG. 3 is a structural diagram of an electronic device according to an embodiment of the present disclosure.

Referring to FIG. 3, the first electronic device comprises: a first operation acquiring unit 301 configured to acquire a first operation on the unlocking graphic interface when the first electronic device is in the locked state; a first detecting unit 302 configured to detect whether digit information corresponding to the first operation matches a phone number; and a calling unit 303 configured to call a second electronic device when the digit information matches the phone number, wherein the phone number of the second electronic device is the digit information.

Preferably, the graphics in the unlocking graphic interface correspond to at least the digits from 0 to 9.

Preferably, the first electronic device further comprises a searching unit configured to search communication information stored in the first electronic device when the digit information matches the phone number. The calling unit 303 is further configured to call the second electronic device when the phone number is found in the communication information.

Preferably, the first electronic device further comprises a second detecting unit configured to detect whether the digit information meets an unlocking condition when the digit information does not match the phone number. The first electronic device further comprises a first unlocking unit configured to control a current state of the first electronic device to be changed from the locked state to the unlocked state when the second detecting unit detects that the digit information meets the unlocking condition.

Preferably, the first electronic device further comprises a first graphic determining unit configured to determine, from the unlocking graphic interface, a first unlocking graphic corresponding to the first operation when the digit information does not match the phone number. The first electronic device further comprises a second unlocking unit configured to control a current state of the first electronic device to be changed from the locked state to the unlocked state when the first unlocking graphic meets an unlocking condition.

Preferably, the first electronic device further comprises a second operation acquiring unit configured to acquire a second operation on the unlocking graphic interface. The first electronic device further comprises a second graphic determining unit configured to determine, from the unlocking graphic interface, a second unlocking graphic corresponding to the second operation. The first electronic device further comprises a third unlocking unit configured to control the current state of the first electronic device to be changed from the locked state to the unlocked state when both of the second unlocking graphic and the digit information meet the unlocking condition.

One or more technical solutions provided by the embodiments of the present disclosure have at least technical effects or advantages as follows.

Firstly, in an embodiment of the present disclosure, when the first electronic device is in the locked state, the first operation on the unlocking graphic interface is acquired, and the second electronic device is called when the digit information corresponding to the first operation matches the phone number. In this way, it enables the first electronic device to call the second electronic device by the first operation on the unlocking graphic interface even when the first electronic device is in the locked state. Thereby, this can solve the technical problem that a call cannot be made when an existing electronic device is in the locked state and achieve the technical effect that a call can be made even when the electronic device is in the locked state, while improving usability and brining the better user experience.

Secondly, in an embodiment of the present disclosure, the second electronic device is called when a number matched with the digit information is found in the communication information stored in the first electronic device. This can improve the security of the electronic device, while bring the better user experience.

Thirdly, in an embodiment of the present disclosure, the current state of the first electronic device is controlled to be changed from the locked state to the unlocked state after the second unlocking graphic corresponding to the second operation on the unlocking graphic interface is acquired and both of the second unlocking graphic and the digit information meet the unlocking condition. This can perform the unlocking by means of gestures and passwords, and therefore improve the security of the electronic device.

Although the preferred embodiments of the present disclosure have been described, further alterations and modifications may be made to these embodiments by those skilled in the art once they know the basic inventive concept. Therefore, the following claims are intended to cover the preferred embodiments and all alterations and modifications falling into the scope of the present disclosure.

It is obvious that those skilled in the art may make various modifications and variations to the present disclosure without departing from the spirit and scope of the present disclosure. Therefore, if these modifications and variations of the present disclosure belong to the scope of the claims of the present disclosure and its full equivalents, then the present disclosure are intended to cover these modifications and variations.

What is claimed is:

1. An information processing method comprising:
   acquiring a first operation on an unlocking graphic interface of an electronic device in a locked state;
   detecting whether digit information corresponding to the first operation is a phone number;
   calling the phone number when the digit information is the phone number;
   when the digit information is not the phone number, detecting whether the digit information and a first unlocking graphic corresponding to the first operation meet an unlocking condition and controlling a current state of the electronic device to be changed from the locked state to an unlocked state when the unlocking condition is met.

2. The method of claim 1, wherein calling the phone number when the digit information is the phone number comprises:
   searching communication information stored in the electronic device; and
   calling the phone number when the phone number is found in the communication information.

3. The method of claim 2, wherein the unlocking graphic corresponds to at least digits from 0 to 9.

4. The method of claim 1, wherein the unlocking graphic corresponds to at least digits from 0 to 9.

5. An electronic device, comprising:
   a first operation acquiring unit configured to acquire a first operation on an unlocking graphic interface of the electronic device in a locked state;
   a first detecting unit configured to detect whether digit information corresponding to the first operation is a phone number; and
   a calling unit configured to call the phone number when the digit information is the phone number;
   an unlocking unit configured to, when the digit information is not the phone number, detect whether the digit information and a first unlocking graphic corresponding to the first operation meet an unlocking condition and control a current state of the electronic device to be changed from the locked state to an unlocked state when the unlocking condition is met.

6. The electronic device of claim 5, wherein the electronic device further comprises a searching unit configured to search communication information stored in the electronic device,
   wherein the calling unit is further configured to call the phone number when the phone number is found in the communication information.

* * * * *